United States Patent [19]
Boll et al.

[11] Patent Number: 6,019,270
[45] Date of Patent: Feb. 1, 2000

[54] SOLDERING IRON TIP

[75] Inventors: Stephen E. Boll, Vestal; James Kenneth Lake, Endicott, both of N.Y.; Randy C. Long, Friendsville, Pa.; Peter Michael Ziolkowski, Apalachin, N.Y.

[73] Assignee: Lockheed Martin Corporation, Bethesda, Md.

[21] Appl. No.: 08/664,220

[22] Filed: Jun. 11, 1996

[51] Int. Cl.⁷ ........................................... B23K 3/02
[52] U.S. Cl. ........................... 228/54; 228/55; 29/525.01
[58] Field of Search ..................... 228/55, 54; 29/525.01

[56] References Cited

U.S. PATENT DOCUMENTS

| | | | |
|---|---|---|---|
| 2,724,041 | 11/1955 | Anton | 228/55 |
| 3,111,101 | 11/1963 | Boggs, Sr. et al. | 228/55 |
| 3,316,385 | 4/1967 | Anton | 219/236 |
| 3,851,145 | 11/1974 | Fukanaga | 228/54 |
| 4,187,972 | 2/1980 | Vella | 228/55 |
| 5,032,702 | 7/1991 | Scholz | 219/85.22 |

OTHER PUBLICATIONS

The Condensed Chemical Dictionary, 8th Ed, 1971, rev. by G. G. Hawley, pp. 471 and 826.

*Primary Examiner*—Patrick Ryan
*Assistant Examiner*—Jeffrey T. Knapp
*Attorney, Agent, or Firm*—Lane Aitken & McCann; John P. Shannon; Robert P. Cogan

[57] ABSTRACT

A soldering iron tip includes a removable Invar shield covering a copper core plated with other metals. In one embodiment, the core is plated with iron and, outside a working section of the tip, with nickel and chrome. In another embodiment, the core is plated with chrome.

11 Claims, 1 Drawing Sheet

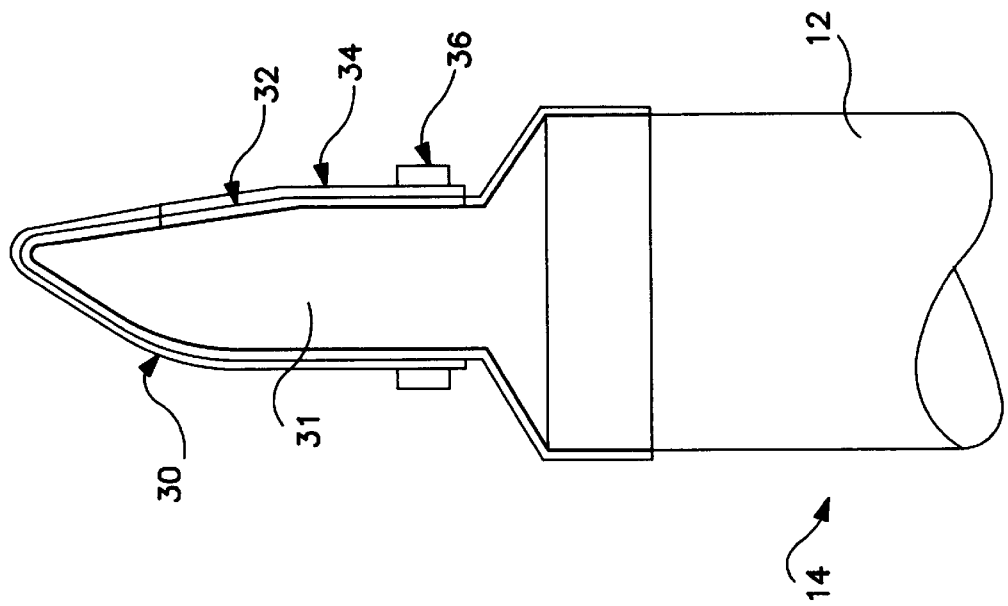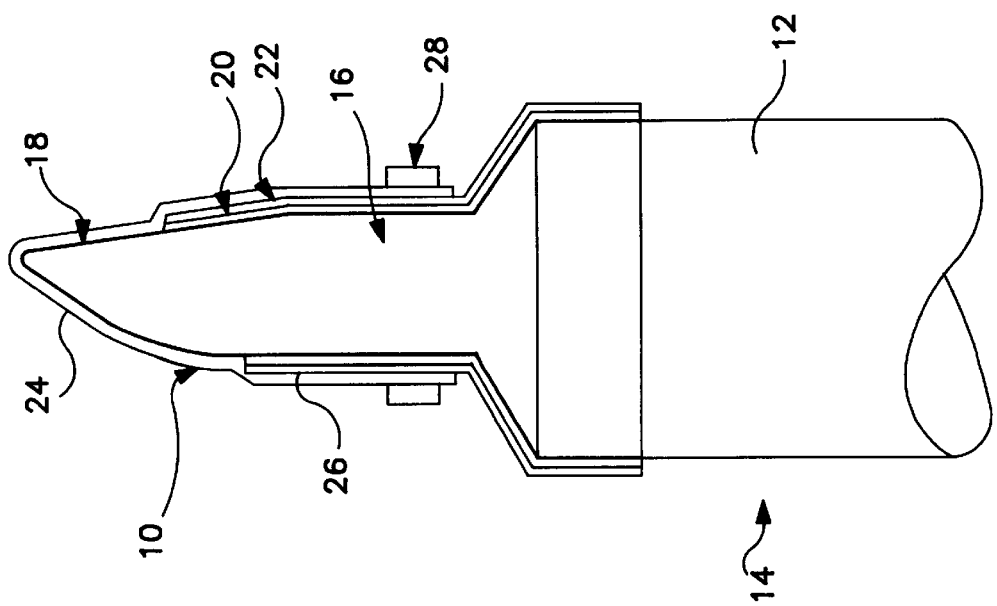

SOLDERING IRON TIP

BACKGROUND OF THE INVENTION

The present invention relates to a soldering iron tip and, more particularly, to an arrangement for extending the life of a soldering iron tip.

Commercial soldering iron tips include an iron barrel holding a shaped copper core that is plated with iron, and is additionally plated with nickel and chrome over the iron in areas other than the working section. The chrome is not wettable by solder and, therefore, acts as a dam restricting the solder to the working section of the soldering iron tip. The nickel helps bind the chrome to the iron. The iron plating defines the exterior surface of the working section of the tip, which is wetted with a small volume of solder, which it retains. The tips are expensive. Soldering iron tips fail as a result of cracking in the iron plating, abrasion and/or wear in the iron plating, and flux corrosion of the iron plating, any one of which exposes the copper core to flux corrosion and digestion by molten solder. Soldering iron tip failure can also occur by dewetting of the iron plating due to high-temperature oxidation.

SUMMARY OF THE INVENTION

In accordance with the present invention, a removable, replaceable shield, generally in the form of a cap, envelops the soldering iron tip and, thus, defines the exterior surface of the working section. The shield is made of a material which is wettable with solder, resistant to chemical attack from flux, and resistant to wear and abrasion. A material which is well-suited for the shield is Invar, which is a trademark for an iron-nickel alloy containing from approximately 40% to approximately 50% nickel and characterized by an extremely low coefficient of thermal expansion. The shield is held in place by a spring clip, which forces the shield against the soldering iron tip. Since the shield is the external surface of the working section of the tip, the shield is wetted with a small volume of solder. If dewetting should occur, the soldering iron tip is easily and inexpensively repaired by replacing the shield.

In a first embodiment of the present invention, the replaceable shield is placed over a conventional soldering iron tip plated with iron, nickel and chrome, such as a soldering iron tip in which the iron plating has deteriorated or failed. Thus, the shields are well suited to retrofitting conventional soldering iron tips, thereby saving expensive, otherwise unusable tips. By this embodiment of the present invention, the copper core of the soldering iron tip is protected if cracking of the iron plating occurs. In addition, abrasion and/or wear of the iron plating is prevented, and the iron plating is partially protected from flux corrosion.

In a second embodiment of the present invention, the replaceable shield is placed over a soldering iron tip having a copper core, which is plated with chrome but not with iron or nickel. By this embodiment of the present invention, cracking of the iron plating, abrasion and wear of the iron plating, and flux corrosion of the iron plating are all eliminated. Furthermore, if dewetting should occur, the shield is removable and replaceable.

BRIEF DESCRIPTION OF THE DRAWINGS

FIG. 1 is a schematic cross section of a first embodiment of soldering iron tip according to the present invention; and FIG. 2 is a schematic cross section of a second embodiment of soldering iron tip according to the present invention.

DETAILED DESCRIPTION OF THE PREFERRED EMBODIMENTS

As can be seen from FIG. 1, the soldering iron tip according to the present invention, which is designated generally by the reference numeral 10, is attached to the barrel 12 of a soldering iron 14 in a conventional manner. The soldering iron 14 has a core 16 of a good heat-conducting material, usually copper. The copper core 16 is plated with iron 18, and then with nickel 20 on a portion of the iron, and chrome 22 on top of the nickel. The nickel 20 and the chrome 22 do not cover the iron plating 18 in a working section 24 of the tip 10. Therefore, the iron plating 18 defines the surface of the working section 24. The structure described thus far in connection with FIG. 1 is conventional soldering iron tip structure.

By the present invention, a removable, replaceable shield 26, in the form of a cap, is placed over the plated core 16, the shield having an interior surface having approximately the same size and shape as the exterior surface of the plated core 16. Thus, the shield 26 surrounds the tip 10, covering the entire exterior surface of the plated core 16, and conforms closely to the shape of the plated core 16, the inner surface of the shield 26 being in contact with the exterior surface of the plated core 16. Furthermore, the portions of the shield 26 which cover the nickel plating 20 and the chrome plating 22 are sized and shaped to accommodate that plating. The shield 26 is made of a material which is wettable by solder, resistant to wear and abrasion, and resistant to chemical attack from flux. An iron-nickel alloy, more particularly, Invar, which is an iron-nickel alloy containing from approximately 40% to approximately 50% nickel and having an extremely low coefficient of thermal expansion, has been found to be suitable. The shield 26 envelops and engages the plated core 16. An open end of the shield 26 extends beyond the working section 24 of the tip 10 toward the barrel 12 of the soldering iron 14.

The shield 26 is held on to the plated core 16 by a clip 28, such as a spring clip of U-shape, extending around and engaging an external surface of the shield 26 between the working section 24 of the tip 10 and the barrel 14. The clip 28 forces the shield 26 into engagement with the plated core 16 and thereby holds the shield on the core. Thus, the present invention is well suited for retrofitting on existing soldering iron tips.

As can be seen from FIG. 2, a soldering iron tip 30 according to the present invention can comprise a core 31 of, for example, copper, which is plated with a material 32 which is non-wettable with solder and which can be applied to the core 31 by a plating process. Chrome is an example. The chrome plating 32 can be over the entire surface of the core 31. A shield 34 in the form of a cap having an internal surface with substantially the same size and shape as the external surface of the plated core 31 is placed over the core. The shield 34 is made of the same material as the shield of the FIG. 1 embodiment. Furthermore, the shield 34 is held on the plated core 31 by a clip 36 of the same type as the clip 28 described in connection with the embodiment of FIG. 1.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

We claim:

1. A method of extending the life of a soldering iron tip having a core plated with a metal, comprising:

enclosing said core with a removable, replaceable shield made of a material wettable by solder and resistant to corrosion by flux.

2. The method of claim 1, wherein said material is an iron-nickel alloy.

3. The method of claim 2, wherein said iron-nickel alloy is an alloy containing from approximately 40% to approximately 50% nickel.

4. A soldering iron tip comprising;
- a core of a heat conducting material, said core having an exterior surface plated with a metal; and
- a removable shield covering said core, said shield being made of a material wettable by solder and resistant to corrosion by flux.

5. The soldering iron tip of claim 4, wherein said heat conducting material is copper.

6. The soldering iron tip of claim 4, wherein said metal is iron.

7. The soldering iron tip of claim 4, wherein said metal is chrome.

8. The soldering iron tip of claim 4, further comprising means for holding said shield in place on said core, said holding means comprising a clip.

9. The soldering iron tip of claim 4, wherein said shield covers the entire exterior surface of said core, said shield being in contact with said core.

10. The soldering iron tip of claim 4, wherein said material is an iron-nickel alloy.

11. The soldering iron tip of claim 10, wherein said iron-nickel alloy is an alloy containing from approximately 40% to approximately 50% nickel.

* * * * *